(12) United States Patent
DiBella

(10) Patent No.: US 12,103,466 B2
(45) Date of Patent: Oct. 1, 2024

(54) UNIVERSAL CELL PHONE HOLDER

(71) Applicant: Salvatore DiBella, Port Saint Lucie, FL (US)

(72) Inventor: Salvatore DiBella, Port Saint Lucie, FL (US)

(*) Notice: Subject to any disclaimer, the term of this patent is extended or adjusted under 35 U.S.C. 154(b) by 156 days.

(21) Appl. No.: 17/524,705

(22) Filed: Nov. 11, 2021

(65) Prior Publication Data

US 2023/0142398 A1    May 11, 2023

(51) Int. Cl.
| | |
|---|---|
| B60R 11/02 | (2006.01) |
| B60R 11/00 | (2006.01) |
| H04B 1/3888 | (2015.01) |
| H04M 1/04 | (2006.01) |

(52) U.S. Cl.
CPC ........ B60R 11/0241 (2013.01); H04B 1/3888 (2013.01); H04M 1/04 (2013.01); *B60R 2011/0033* (2013.01)

(58) Field of Classification Search
CPC .................................................. B60R 11/0241
See application file for complete search history.

(56) References Cited

U.S. PATENT DOCUMENTS

| | | | |
|---|---|---|---|
| 8,479,960 B2 | 7/2013 | Lopez-Apodaca | |
| 8,668,123 B2 | 3/2014 | Richmond | |
| 9,800,283 B2 | 10/2017 | Schmidt | |
| 10,315,585 B2 | 6/2019 | Minn et al. | |
| 2011/0248060 A1 | 10/2011 | Luk et al. | |
| 2015/0084364 A1* | 3/2015 | Cha | B60R 7/05 296/97.5 |

FOREIGN PATENT DOCUMENTS

CA         2888329         10/2016

* cited by examiner

*Primary Examiner* — Hsinchun Liao
(74) *Attorney, Agent, or Firm* — Edison Law Group (57) ABSTRACT

Disclosed is a holder for retaining an electronic device within a vehicle. The holder includes a first segment oriented along a first axis, a second segment unitary with the first segment and oriented along a second axis, and a third segment unitary with the second segment and oriented along a third axis. The second segment includes opposite end portions. The vehicle includes a sun visor mounted on an elongated member mounted to an inner surface of the vehicle. The elongated member includes opposite end portions. The first segment of the holder includes a hooked end portion that is non-rotatably secured to one of the opposite end portions of the elongated member. The holder includes a strip of hook-and-loop material adhesively secured to the third segment. The cell phone has a backside surface to which is secured another strip of hook-and-loop material. One of the strips of hook-and-loop material, when engaged with and secured to the other of the strips of hook-and-loop material, secures the cell phone to the third segment.

6 Claims, 8 Drawing Sheets

UNIVERSAL CELL PHONE HOLDER

REFERENCE TO RELATED APPLICATION

The present United States patent application is a nonprovisional utility patent application based upon my provisional United States utility patent application bearing U.S. Ser. No. 63/205,284 filed Nov. 30, 2020, which is hereby incorporated by reference in its entirety for purposes of priority.

FIELD

My present invention is directed, in general, to a novel cell phone holder designed for hands-free use by the driver of a vehicle. My present invention, more particularly, is directed to an article of manufacture designed for hands-free cell phone use, to enable a driver of a car, SUV, pickup truck, tractor trailer, and other vehicles to maintain eye contact with a road, by presenting a cell phone viewing window at a same level and depth-of-field as a rearview mirror used by the driver.

BACKGROUND

Cell phone use by the driver of a vehicle can result in a variety of unpleasant situations. For instance, a driver of a vehicle, by simply placing a cell phone on an adjacent seat, can find that a sudden turn onto a side street can become a major inconvenience if the cell phone was flung out-of-reach by centripetal acceleration. Moreover, that inconvenience can next amount to an unsafe situation if the cell phone indicates an incoming call and the driver decides to take eyes off the road to search for the phone while driving, with higher speeds often resulting in accidents. Furthermore, many states prohibit a driver from holding a cell phone while driving. Lawful and safe cell phone use by drivers of vehicles is therefore currently needed.

Mindful that many states, for safety reasons, prohibit a driver from holding a cell phone while driving, and that convenient hands-free use of cell phones is desired by most vehicle drivers, I reviewed several commercially available articles of manufacture in this field as well as the prior art which includes US patents and published applications, to find a hands-free solution that is better than my solution.

For instance, U.S. Pat. No. 8,479,960 to Lopez-Apodaca—for a portable telephone holder for a sun visor—states that the holder may take the form of a rectangular box having a back sidewall to which a hanging device such as a spring clip is attached. The holder includes a right sidewall and a left sidewall spaced from the right sidewall, with the left and right sidewalls both being joined to the back sidewall. The holder further includes a front sidewall attached to the left and right sidewalls, and bottom, with all four sidewalls and bottom forming an open top hollow interior. The front sidewall may have at least one opening, so that whenever a phone call is received or sent, a user can activate the cellular phone contained within the holder by touching a key or touch display and thereafter could even use voice commands, after the holder is attached, for example, to a vehicle sun visor.

U.S. Pat. No. 8,668,123 to Richmond discloses a holding apparatus for a communication device such as a cellular phone, personal digital assistant, or smart phone. The holding apparatus includes one or more clips with which to clip the device to a sun visor. While the apparatus holds the communication device in such a manner as to provide a vehicle driver with hands-free use of the communication device, particularly while driving, the '123 patent assertion that a display of the communication device can be easily observed, is undermined by the fact that clips at the sun visor level retain a communication device above a driver's line-of-sight.

U.S. Pat. No. 9,800,283 to Schmidt discloses a two-piece mobile device holder having a case assembly and a mounting assembly. The case assembly is configured to receive and secure a mobile device, e.g., a smart phone. The mounting assembly is said to be configured to be detachably coupled to other objects, e.g., a sun visor.

U.S. Pat. No. 10,315,585 to Minn et al. discloses an adjustable portable device holder that includes an adjustable clamping element and a rotatable mounting element attached to the clamping element for removably securing a portable device such as an iPhone or smart phone, e.g., to a vehicle dashboard or sun visor.

US published patent application 2011/0248060 to Luk et al. discloses a protective holder for mobile devices including cell phones. The device holder—including clips, elastic straps, Velcro fasteners, double-sided sticking tape, strips and hooks—is removably secured to a motor vehicle sun visor at the sun visor level.

Canadian patent application 2,888,329 A1 to Karpiuk discloses a holder which includes reversible attaching means for mounting a portable mobile device to the sun visor of a car. The attaching means consists of shaped segments of Velcro fastener attached to the visor and to the back of the portable mobile device, to permit select mounting orientations (such as portrait or landscape orientations).

U.S. Pat. No. 10,836,326 to Yang discloses a vehicle mobile phone holder, including a base, a surface cover, a hinge member that provides a clamping force between the base and the surface cover, and a wireless charging component. When not used to charge the mobile phone, the vehicle mobile phone holder may be used as a mobile phone support. At such time, a mobile phone or other electronic device can be removably secured to a vehicle console by the vehicle mobile phone holder.

U.S. Pat. No. 6,185,302 to Rytkonen et al. discloses a holder installable in a vehicle in which a cell phone is retained while the vehicle is driven by a driver. The phone is locked into the holder with a turning movement, which causes the phone to push against a thrust block and at the same time against a guiding surface in an outer shell part which wedges a locking claw into a hollow on a side of the phone. The phone is released from the locked position by pressing a shaft, by means of a push lever, so that a locking element is freed from a catch causing an end of a spring to return the phone to an initial position, for removing the phone from the holder.

U.S. Pat. No. 6,059,156 to Lehtinen discloses a system for temporarily attaching a portable device, such as a mobile phone, to a dashboard of a car. The system includes a pocket-shaped apparatus casing, a holder connected to a back plate, to enable the portable device to be temporarily attached to the casing, and fastening members, to enable the casing to be fastened to the dashboard of a car.

U.S. Pat. No. 10,900,608 to Ahi discloses a mobile phone holder designed for mounting a mobile phone to the dashboard of a car. This mobile phone holder is either integrated into the back of a mobile phone or is attached to the back surface of the mobile phone through adhesive pads, or suction cups. One embodiment of the mobile phone holder includes a closed loop around the air vent bars, so that sudden turns of the car will not result in detachment, with the phone on the floor.

Finally, U.S. Pat. No. 6,491,194 to Marvin discloses a cell phone holder for motor vehicles. The holder has a rear surface consisting of a spine that includes a first panel of hook-and-loop fabric (e.g., Velcro material) secured thereto. The first panel is removably securable to another, second panel of hook-and-loop fabric (known as "Velcro" material), secured to a surface for access by the phone user.

However, none of these patent references, considered individually or in combination, discloses the present subject matter, which solves a current problem involving enabling the drivers of cars, SUVs, pickup trucks, tractor trailers, and other vehicles to maintain eye contact with the road, by presenting a cell phone viewing window located to the left of a field-of-view of the driver of the vehicle, with the cell phone viewing window being slightly above, or slightly above, or approximately at the same level as a rearview mirror within the vehicle that is used by the driver.

SUMMARY

The holder, for retaining an electronic device such as a cell phone within a vehicle, includes a first elongated segment oriented along a first axis. The holder also includes a second elongated segment oriented along a second axis. The second segment includes a first end portion unitary with the first segment. The second segment also includes a second end portion spaced opposite the first end portion. The holder further includes a third elongated segment oriented along a third axis. The third segment is unitary with the second end portion of the second segment.

The vehicle includes a sun visor mounted on an elongated member. The elongated member is mounted to an inner surface of the vehicle. The elongated member includes a first end portion and a second end portion spaced opposite the first end portion. The first elongated segment of the holder includes a hooked end portion that is non-rotatably secured to at least one of the first and second end portions of the elongated member that is connected to the vehicle's inner surface.

The holder further includes a first elongated strip of hook-and-loop fabric material adhesively secured to the third elongated segment along the third axis. The cell phone has an exterior backside surface to which is secured a second strip of hook-and-loop fabric material. The second strip of hook-and-loop material, when engaged with and removably secured to the first strip of hook-and-loop fabric material, thus secures the cell phone to the third elongated segment of the holder.

BRIEF DESCRIPTION OF THE FIGURES

Throughout the drawing figures and detailed description, I shall use similar reference numerals to refer to similar components of the present subject matter.

DETAILED DESCRIPTION

Please refer to the figures referenced below to view a present embodiment of the present subject matter. An illustrated embodiment of the present subject matter—my present invention—is directed to an electronic device holder that I designed to securely retain an electronic device including but not limited to a cell phone such as an iPhone (which is sold, for example, by Apple) and/or a "smart" phone (which is sold, for example, by Samsung and others) within a vehicle. My electronic device holder is also designed to securely, yet removably, retain the electronic device in a manner, so as to present to a driver of a vehicle including but not limited to a car, a van, a bus, a sport utility vehicle, a pickup truck, and a tractor trailer, with an electronic device viewing window positioned at substantially the same level as a driver's rearview mirror, and to the far left of the rearview mirror, and thus away from a driver's view-of-the-road through a windshield of the vehicle.

My electronic device holder 100 (please see FIG. 1) is of special design for securely, yet removably, retaining an electronic device such as a smaller cell phone 200A or a larger cell phone 200B (please see FIG. 2) in a vehicle. My electronic device holder 100, made of a relatively stiff metallic or polymeric material, consists of a first elongated segment 102 oriented along a first axis A-A, a second elongated segment 104 oriented along a second axis B-B, and a third elongated segment 106 oriented along a third axis C-C. The first axis A-A is oriented transverse, preferably about 160 degrees, relative to the second axis B-B; and the second axis B-B is oriented transverse, preferably about 90 degrees, relative to the third axis C-C. The second elongated segment 104 has a first end portion 108 unitary the first elongated segment 102 and a second end portion 110 (spaced opposite the first end portion 108) unitary with the third elongated segment 106.

The holder 100, which is preferably about 0.25 inches thick and about 1 inch wide, is made of rigid materials including but not limited to metallic and polymeric materials, to which strips of loop-and-hook fabric can be adhesively attached, and which materials will maintain their rigidity, overall strength, and integrity over time and under conditions where temperatures, to which a holder is subjected, will vary.

Figure 3:
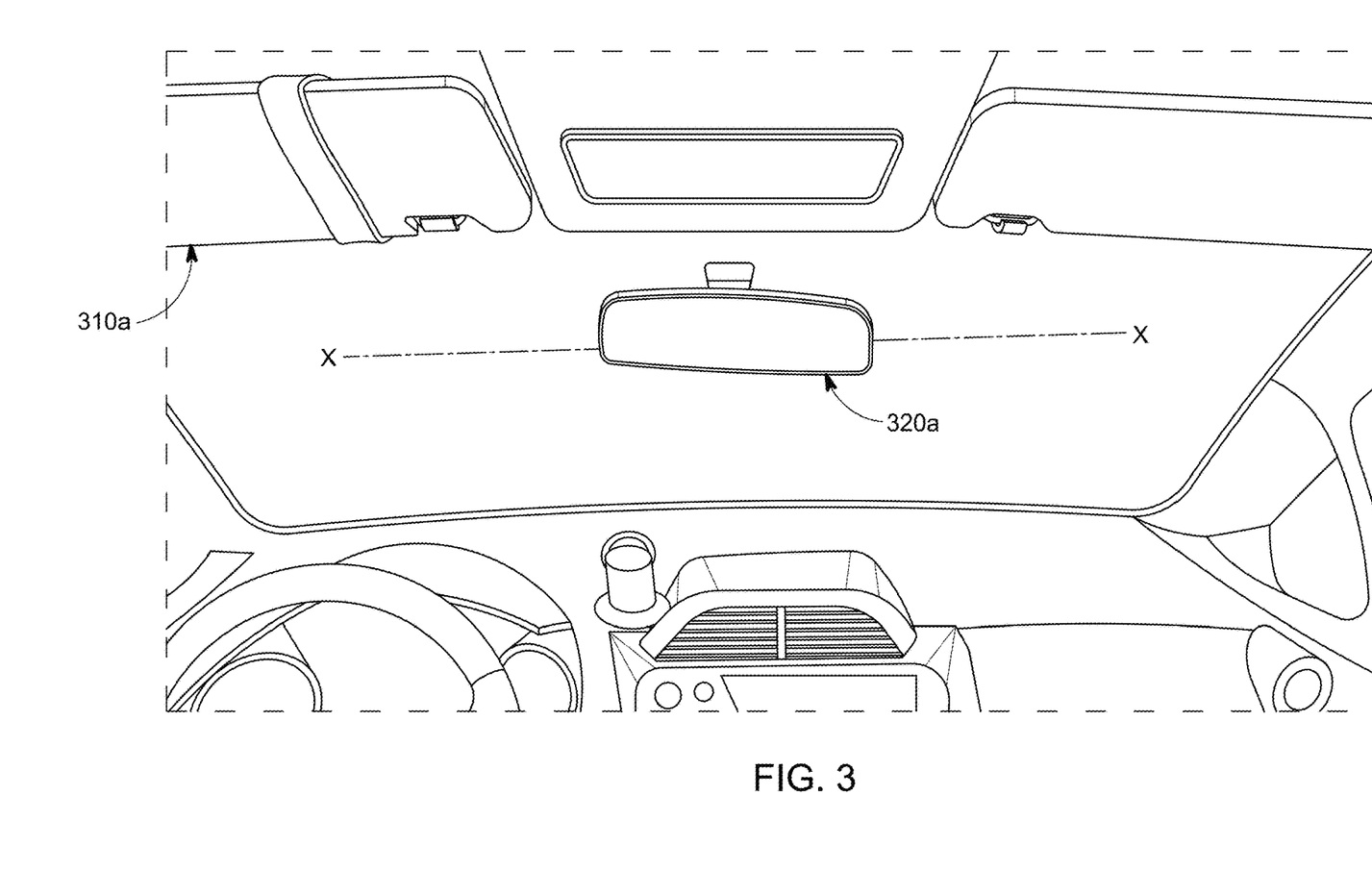
FIG. 3 is a screen shot of a picture of a view through a windshield of a car.

As used throughout this patent specification and for purposes of the present subject matter, the term "vehicle" shall be understood to include but not be limited to: a car, a van, a limousine, a pick-up truck, a bus, a sport utility vehicle ("SUV"), an all-wheel drive ("AWD") vehicle, a tractor trailer (whether or not the tractor is connected to a trailer to become an "18-wheel" vehicle), with a car 300A (please see FIG. 3) being a preferred vehicle for purposes of the present subject matter.

Figure 4:
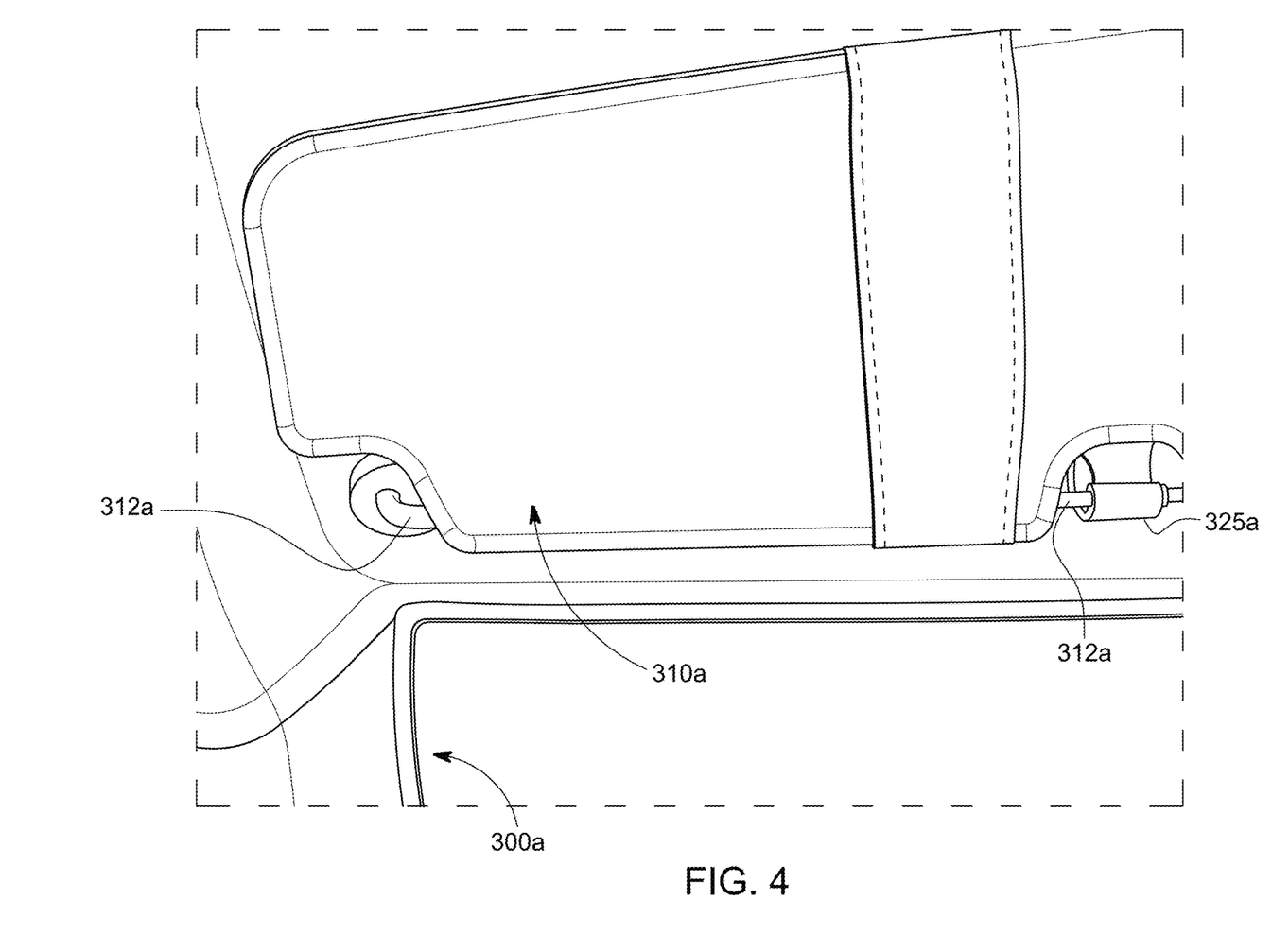
FIGS. 4 and 5 are screen shots of a vehicle component shown in FIG. 3.
Figure 5:
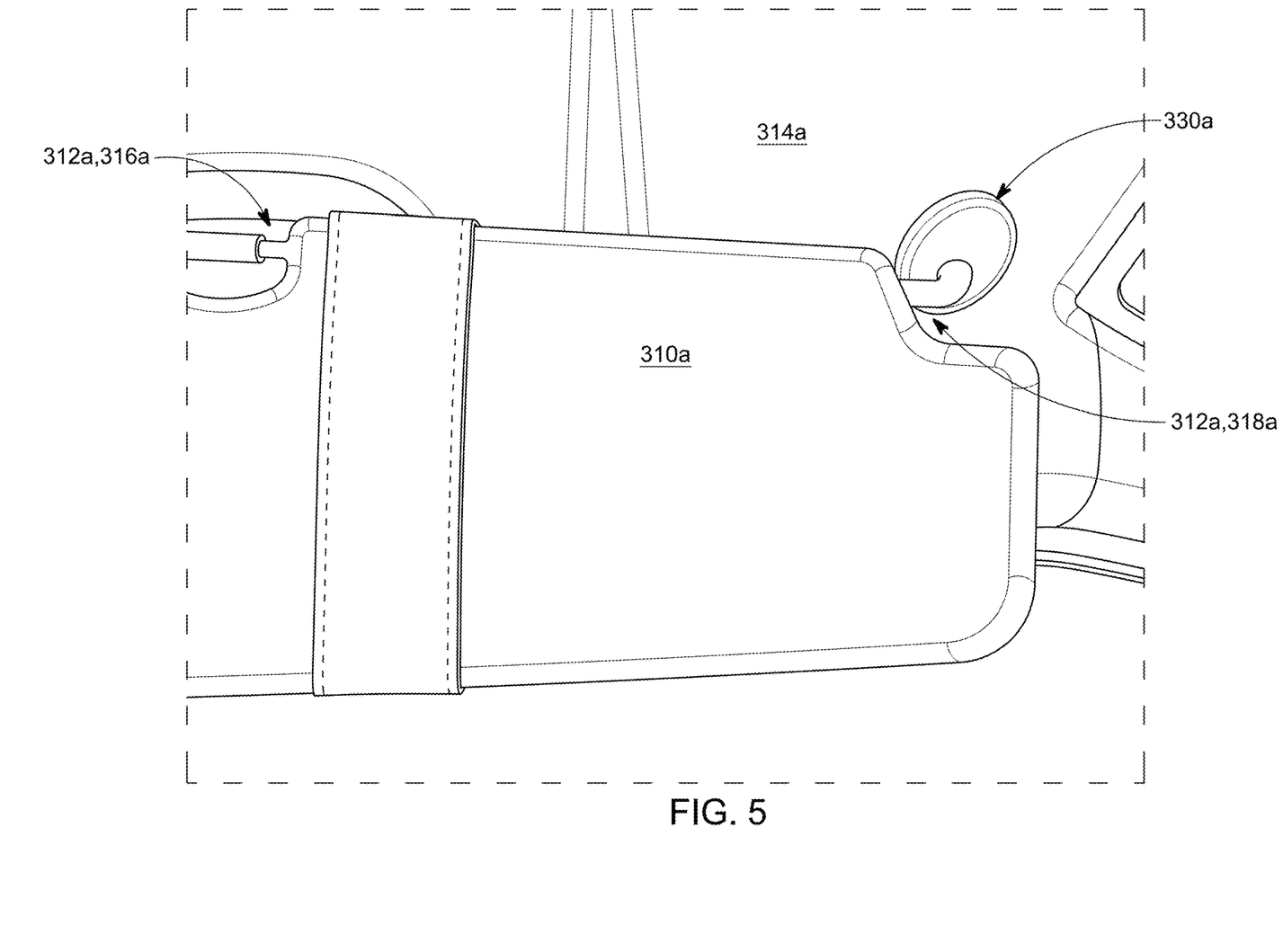

Vehicle 300A (please refer to FIG. 3) includes a sun visor 310A which is mounted on an elongated member or support rod 312A (please see FIG. 4) which, in turn, is mounted to an inner upper surface 314A (please see FIG. 5) of the vehicle 300A. The elongated member or support rod 312A includes opposite end portions, which are described as a support rod first end portion 316A and a support rod second end portion 318A spaced opposite the first end portion 316A (FIG. 5).

Figure 1:
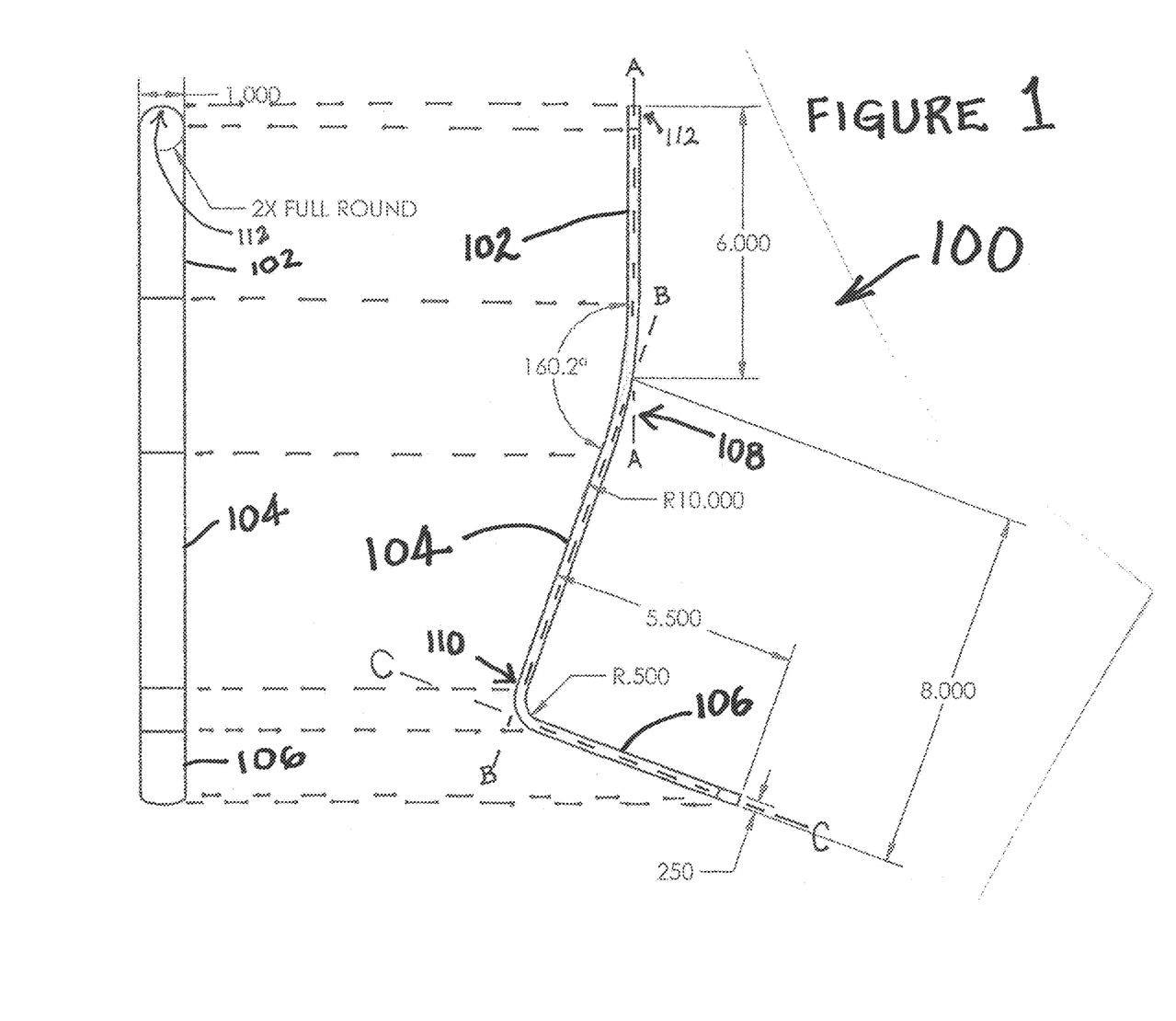
FIG. 1 is a combination including a backside view (left) and side elevational view (right) of an electronic device holder according to the present subject matter.

Briefly referring to FIG. 1, please note that the drawing presented on the right is a mirror-image of the electronic device holder of the present subject matter. Thus, the first elongated segment 102 of the electronic device holder 100, shown schematically, includes a hooked end portion 112 configured and dimensioned to be securely fixed to (and also detachable from) the support rod second end portion 318A (please see FIG. 5) which is located to the far left of a driver of the vehicle.

Further in this regard, the third elongated segment 106 of my electronic device holder 100 (FIG. 1), includes an elongated strip of hook-and-loop fabric 114 oriented longitudinally along longitudinal axis C-C (FIG. 1), and outlined in white (FIG. 6) for purposes of providing dimensional details relative to the third elongated segment 106 of my electronic device holder 100. The hook-and-loop fabric material 114 is adhesively bonded to the third elongated segment 106 by an adhesive material. Presently available adhesive materials that would be suitable for purposes of the present subject matter include wood glues, elastomers, silicone sealants, pressure-sensitive tapes, and pressure-sensitive films. To keep clean and maintain the integrity of the hook-and-loop fabric material, a protective film 116 is used to cover and protect the hook-and-loop fabric material 114 until it is utilized.

Figure 2:
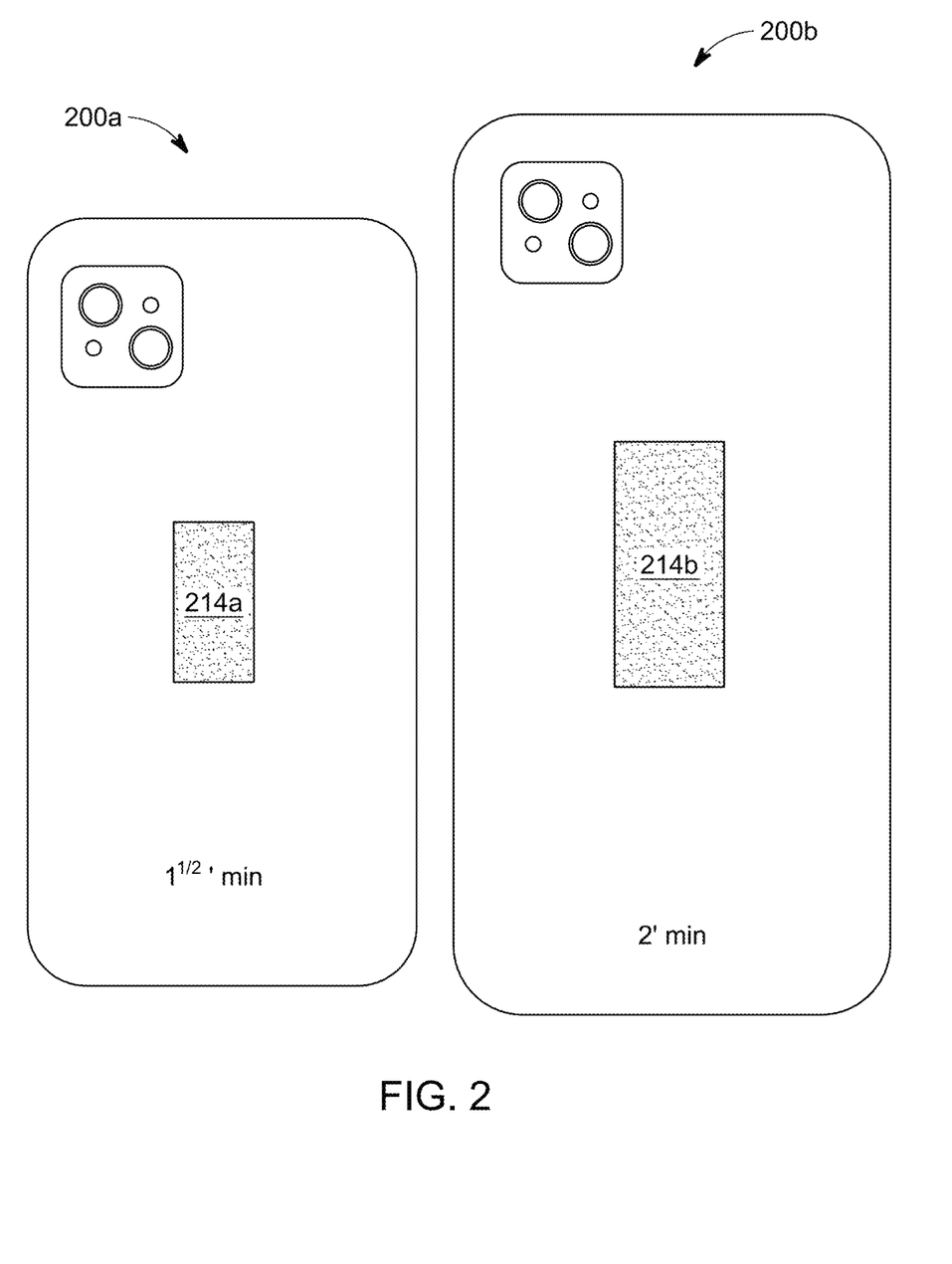
FIG. 2 is a backside view of cell phones used in combination with the holder.

Referring again briefly to FIG. 2, a smaller size cell phone 200A such as an iPhone (sold by Apple in calendar year 2017 approximately) and a larger size cell phone 200B are shown. Each cell phone 200A, 200B in FIG. 2 is shown vertically oriented. Moreover, each cell phone 200A, 200B has a strip of hook-and-loop fabric material adhesively bonded vertically to a backside. Furthermore, the smaller size cell phone 200A has bonded to its backside a strip of hook-and-loop fabric material 214A which, preferably, is about 0.75 inches wide and about 1.5 inches long; and the larger size cell phone 200B has bonded to its backside a strip of hook-and-loop fabric material 214B that, preferably, is 0.75 inches wide and about 2 inches long.

The strips of hook-and-loop fabric material 214A, 214B (FIG. 2)—respectively adhesively bonded to each of the cell phones 200A, 200B—when engaged with and attached to the hook-and-loop fabric material 114 adhesively bonded to the third elongated segment 106, removably secures one of the cell phones 200A and 200B to the third elongated segment 106 of the electronic device holder 100 (FIG. 1).

Figure 6:
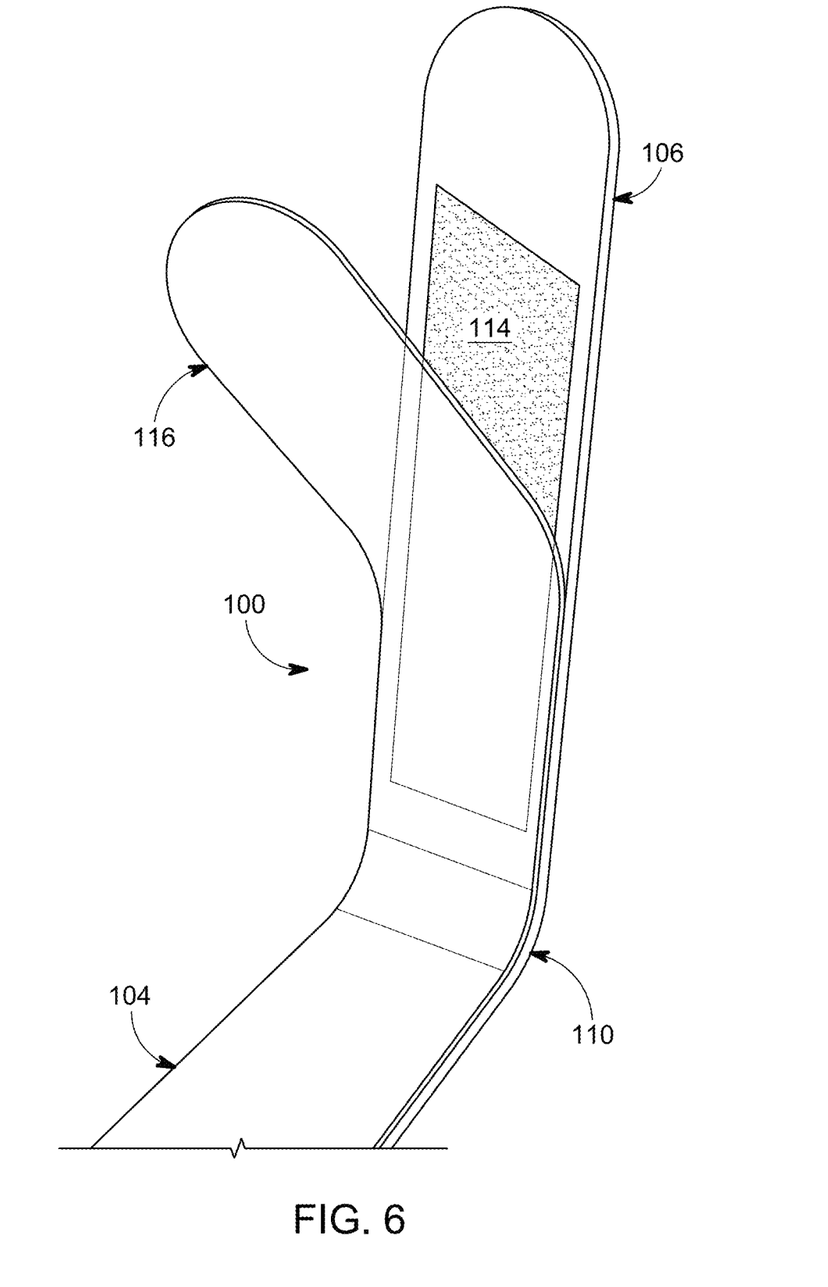
FIG. 6 is an enlarged perspective view of a component shown in FIG. 1.

Installation Instructions for Electronic Device (Universal Cell Phone) Holder: Normally, the sun visor 310A (please see FIG. 4) located in the vehicle 300A for the benefit of the driver will usually have been raised above a typical line-of-sight of the driver and often will additionally have been raised against the inner upper surface 314A (see FIG. 5) of the vehicle 300A. A first step involves bringing the sun visor 310A down, then unclipping the support rod or elongated member 312A from its mount 325A (see FIG. 4), and finally pivoting the formerly clipped end portion 316A of the support rod or elongated member 312A toward the driver side window (FIG. 5). Note that the support rod or elongated member 312A, on which the sun visor 310A is rotatably mounted (FIG. 5), includes the support rod end portion 316A, formerly clipped to the mount 325A (FIG. 4), and the support rod opposite end portion 318A pivotally mounted to the inner upper surface 314A above the driver by a pivot mechanism 330A. The support rod end portion 318A is secured to the inner upper surface 314A above the driver (FIG. 5). A second step involves mounting the hooked end portion 112 of the electronic device holder 100 (FIG. 1) to the support rod end portion 318A at a location that is far left of the driver (FIG. 5), to avoid impairing or interfering with a driver's view of the road, then next rotating the support rod or elongated member 312A about the pivot mechanism 330A, and finally re-clipping the end portion 316A to the mount 325A. A final step involves attaching the appropriately sized cell phone 200A, 200B to the electronic device holder 100 by securing the hook-and-loop fabric material 214A, 214B adhesively secured to the backside of an appropriately sized cell phone 200A, 200B (FIG. 2) to the hook-and-loop fabric material 114 that is adhesively secured to the third elongated segment 106 of the electronic device holder 100 (FIG. 6).

Referring again briefly to FIG. 3, the vehicle 300A is provided with a rear view mirror 320A which is located adjacent to (also described as "located near to") the sun visor 310A which was discussed above in connection with FIGS. 4 and 5. For vehicles having a rear view mirror, mounted similar to the rear view mirror 320A shown in FIG. 3, the rear view mirror 320A provides a horizontal axis X-X that is used by an operator or driver of vehicle 300A to determine forward, adjacent (i.e., along the left-hand side and/or right-hand side), and backside traffic activity.

Figure 7:
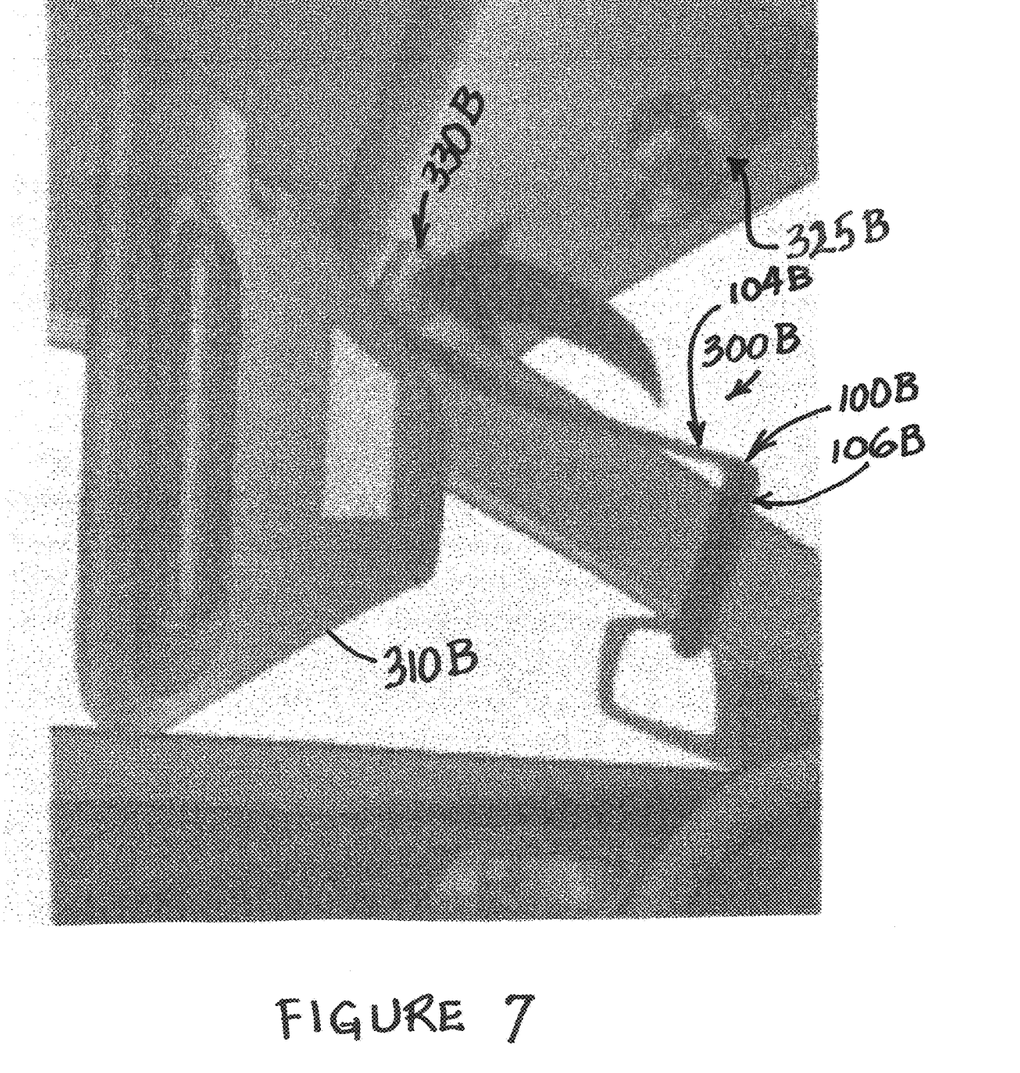
FIGS. 7 and 8 are perspective views that a driver within a vehicle would see.
Figure 8:
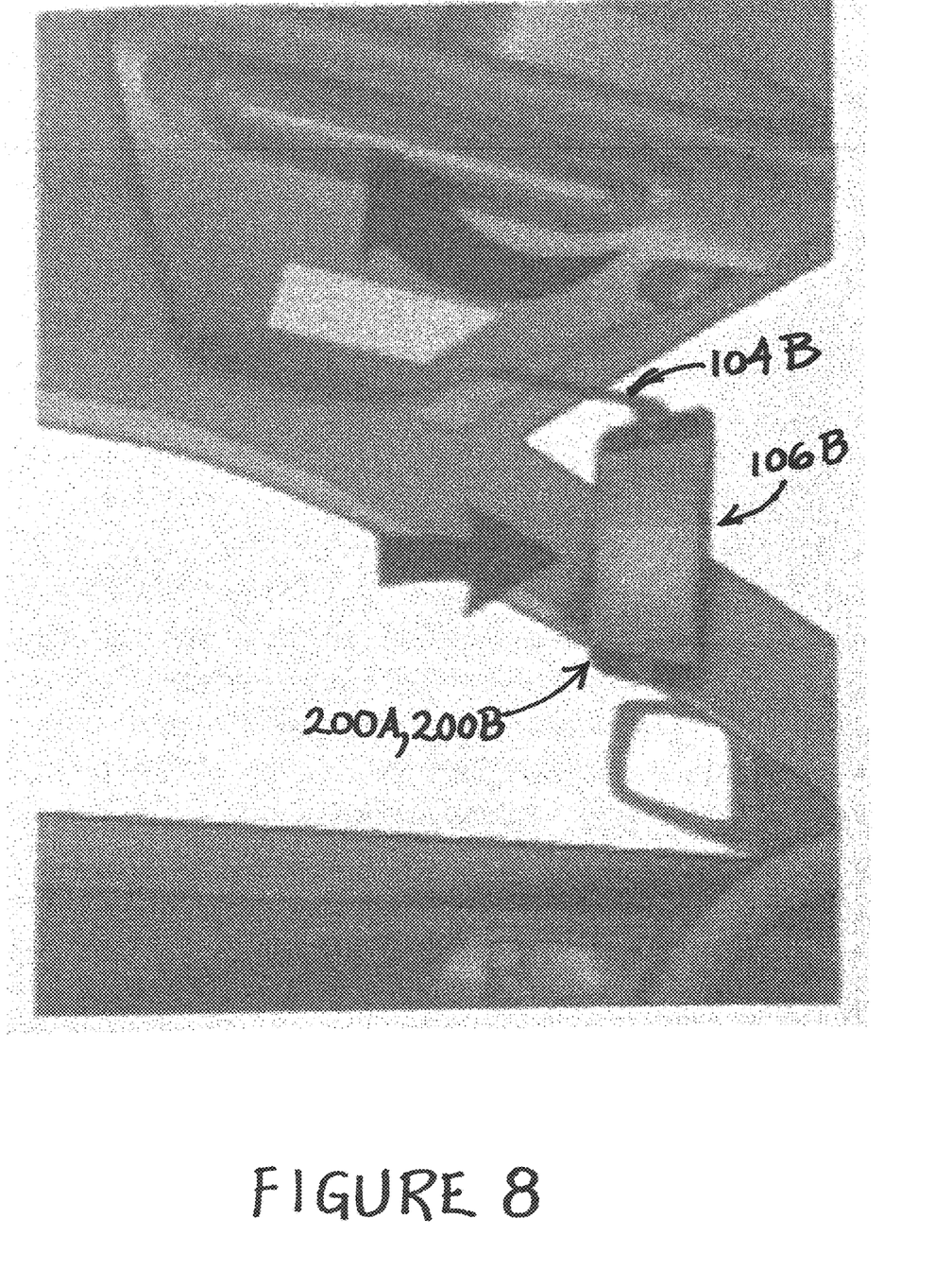

As noted above, the drawing presented on the right side of FIG. 1 is a mirror-image of the electronic device holder 100 of the present subject matter. Thus, the first elongated segment 102 of the electronic device holder 100, shown schematically, includes the hooked end portion 112 configured and dimensioned to be securely fixed to (yet also removable from) the support rod second end portion 318A (FIG. 5) which is located to the far left of a driver of the vehicle. When the hooked end portion 112 (FIG. 1) is secured to the support rod end portion 318A (FIG. 5), the hooked end portion 112 (FIG. 1) is non-rotatably secured to the support rod end portion 318A (FIG. 5), to enable the second segment 104 (FIG. 1) and/or 104B (FIG. 7) of the electronic device holder 100 (FIG. 1) to be urged upwardly and away from the driver, which in turn enables the third segment 106 (FIG. 1) and/or 106B (FIG. 7) of the electronic device holder 100 (FIG. 1) to be located along, either slightly above or slightly below, the horizontal axis X-X (FIG. 3), to enable an appropriate cell phone 200A, 200B to be held by the third segment 106 (FIG. 1), 106A (FIG. 8) toward the far left side of a driver's line-of-sight.

The cell phone holder of the present subject matter—my invention—thus enables a driver to periodically check the electronic device holder-mounted cell phone for incoming information and/or the rearview mirror of the vehicle for nearby traffic conditions, while maintaining eye contact with roads being traveled.

What has been illustrated and described in this application is a novel holder for an electronic device such as a cell phone, where the electronic device holder was designed to be used within a vehicle for the purpose of providing a driver of the vehicle with hands-free use of the electronic device. While the present subject matter has been described with reference to exemplary embodiments, the present subject matter is not limited to these examples. On the contrary, many alternatives, changes, and/or modifications will become apparent to those of ordinary skill in the field of the present subject matter after this application is read. Thus, all such alternatives, changes, and/or modifications are to be treated as part of the present subject matter insofar as they fall within the spirit and scope of claims that follow.

I claim:

1. A holder for retaining a cell phone within a vehicle, wherein the holder comprises:
   a first elongated segment disposed along a first axis,
   a second elongated segment disposed along a second axis, wherein the second elongated segment defines a spaced-apart pair of end portions, wherein one of the spaced-apart pair of end portions of the second elongated segment is unitary with one of a pair of opposed ends of the first elongated segment, and a third elongated segment disposed along a third axis, wherein the third elongated segment has an end portion that is unitary with the other one of the pair of end portions of the second elongated segment, wherein the first and second axes are oriented about 160 degrees relative to each other, wherein the vehicle includes:
  a windshield,
  an inner, upper surface that is located adjacent to the windshield,
  an elongated member that is mounted to the inner, upper surface of the vehicle and that is located adjacent to the windshield, and
  a sun visor rotatably mounted on the elongated member, wherein the elongated member defines a pair of opposed end portions, wherein the other one of the pair of opposed ends of the first elongated segment defines an integral hooked end portion removably secured to one of the opposed end portions of the elongated member, wherein the holder further includes a first strip of hook-and-loop fabric material secured to the third elongated segment along the third axis, wherein the cell phone defines an exterior surface to which is secured a second strip of hook-and-loop fabric material, wherein the second strip of hook-and-loop fabric material, when engaged with and removably secured to the first strip of hook-and-loop fabric material, removably secures the cell phone to the third elongated segment of the holder, wherein the sun visor is pivotable about the elongated member between a first position for preventing a driver of the vehicle from viewing the cell phone when the cell phone is removably secured to the third elongated segment and a second position for enabling the driver to view the cell phone when the cell phone is removably secured to the third elongated segment.

2. The holder of claim 1, wherein the vehicle is selected from the group consisting of a car, a sport utility vehicle, a pickup truck, a bus, and a tractor trailer.

3. The holder of claim 2, wherein the vehicle includes a rearview mirror adjacent to the sun visor, and wherein the rearview mirror defines a horizontal axis used by an operator of the vehicle to determine adjacent and rear traffic activity.

4. The holder of claim 3, wherein the holder is configured to orient the cell phone above the horizontal axis of the rearview mirror, to present a cell phone viewing window at a level and at a depth-of-field useful to a driver of the vehicle.

5. The holder of claim 3, wherein the holder is configured to orient the cell phone below the horizontal axis of the rearview mirror, to present a cell phone viewing window at a level and at a depth-of-field useful to a driver of the vehicle.

6. The holder of claim 3, wherein the holder is configured to orient the cell phone along the horizontal axis of the rearview mirror, to present a cell phone viewing window at a level and at a depth-of-field useful to a driver of the vehicle.

* * * * *